(12) United States Patent
Ugur et al.

(10) Patent No.: US 10,523,960 B2
(45) Date of Patent: *Dec. 31, 2019

(54) MOTION PREDICTION IN VIDEO CODING

(71) Applicant: Nokia Technologies Oy, Espoo (FI)

(72) Inventors: Kemal Ugur, Tampere (FI); Jani Lainema, Tampere (FI); Antti Hallapuro, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,495

(22) Filed: Jan. 22, 2018

(65) Prior Publication Data

US 2018/0146207 A1    May 24, 2018

Related U.S. Application Data

(63) Continuation of application No. 15/490,469, filed on Apr. 18, 2017, now Pat. No. 9,877,037, which is a
(Continued)

(51) Int. Cl.
*H04N 19/50* (2014.01)
*H04N 19/42* (2014.01)
(Continued)

(52) U.S. Cl.
CPC .......... *H04N 19/50* (2014.11); *H04N 19/105* (2014.11); *H04N 19/42* (2014.11); *H04N 19/523* (2014.11);
(Continued)

(58) Field of Classification Search
None
See application file for complete search history.

(56) References Cited

U.S. PATENT DOCUMENTS 6,512,523 B1    1/2003    Gross
6,539,058 B1    3/2003    Pearlstein et al.
(Continued)

FOREIGN PATENT DOCUMENTS

CA           2729615 A1      1/2010
WO      WO 2008/048864 A2    4/2008

OTHER PUBLICATIONS

"Advanced Video Coding for Generic Audiovisual Services", Series H: Audiovisual and Multimedia Systems, Infrastructure of audiovisual services—Coding of moving video, ITU-T Recommendation H.264, Nov. 2007, 564 pages.
(Continued)

*Primary Examiner* — Peter D Le
(74) *Attorney, Agent, or Firm* — Alston & Bird LLP

(57) ABSTRACT

There is disclosed apparatuses, methods and computer programs for utilizing motion prediction in video coding. A block of pixels of a video representation encoded in a bitstream is read, and a type of the block is determined. If the determining indicates that the block is a block predicted by using two or more reference blocks, a first reference pixel location in a first reference block is determined and a second reference pixel location in a second reference block is determined. The first reference pixel location is used to obtain a first prediction. Said first prediction has a second precision, which is higher than the first precision. The second reference pixel location is used to obtain a second prediction, which also has the second precision. The first prediction and the second prediction are combined to obtain a combined prediction; and the precision of the combined prediction is reduced to the first precision.

26 Claims, 11 Drawing Sheets

Related U.S. Application Data continuation of application No. 15/250,124, filed on Aug. 29, 2016, now Pat. No. 9,628,816, which is a continuation of application No. 13/344,893, filed on Jan. 6, 2012, now Pat. No. 9,432,693.

(60) Provisional application No. 61/430,694, filed on Jan. 7, 2011.

(51) Int. Cl.
  *H04N 19/523* (2014.01)
  *H04N 19/577* (2014.01)
  *H04N 19/105* (2014.01)
  H04N 19/176 (2014.01)
  H04N 19/182 (2014.01)
  H04N 19/184 (2014.01)

(52) U.S. Cl.
  CPC ......... *H04N 19/577* (2014.11); *H04N 19/176* (2014.11); *H04N 19/182* (2014.11); *H04N 19/184* (2014.11)

(56) References Cited

U.S. PATENT DOCUMENTS

| | | | |
|---|---|---|---|
| 9,432,693 | B2 | 8/2016 | Ugur et al. |
| 9,877,037 | B2 | 1/2018 | Ugur et al. |
| 2005/0105620 | A1* | 5/2005 | Fukushima ............ H04N 19/51 375/240.16 |
| 2008/0089417 | A1 | 4/2008 | Bao et al. |
| 2009/0087111 | A1 | 4/2009 | Noda et al. |
| 2009/0257503 | A1 | 10/2009 | Ye et al. |
| 2010/0002770 | A1 | 1/2010 | Motta et al. |
| 2010/0086027 | A1 | 4/2010 | Panchal et al. |
| 2010/0111182 | A1 | 5/2010 | Karczewicz et al. |
| 2013/0142262 | A1 | 6/2013 | Ye et al. |

OTHER PUBLICATIONS

Extended European Search Report from corresponding European Patent Application No. 12731927.5 dated May 6, 2016.
Final Office Action for U.S. Appl. No. 13/344,893 dated Jan. 23, 2015, 20 pages.
International Search Report and Written Opinion received for corresponding Patent Cooperation Treaty Application No. PCT/IB2012/050089 dated May 9, 2012, 14 page.
Non-Final Office Action for U.S. Appl. No. 13/344,893 dated Jul. 16, 2014, 24 pages.
Non-Final Office Action for U.S. Appl. No. 13/344,893 dated Jul. 28, 2015, 17 pages.
Notice of Allowance for U.S. Appl. No. 13/344,893, dated Jun. 14, 2016, 3 pages.
Notice of Allowance for U.S. Appl. No. 15/250,124, dated Feb. 23, 2017, 3 pages.
Notice of Allowance for U.S. Appl. No. 15/490,469, dated Sep. 15, 2017, 13 pages.
Notice of Allowance for U.S. Appl. No. 13/344,893 dated Apr. 27, 2016, 20 pages.
Notice of Allowance for U.S. Appl. No. 15/250,124 dated Dec. 13, 2016, 13 pages.
Office Action for Chinese Patent Application No. 2012800096959 dated Mar. 20, 2017, with English summary, 7 pages.
Office Action from Korean Patent Application No. 2013-7020731, dated Aug. 26, 2015.
Office Action from Korean Patent Application No. 2013-7020731, dated Jul. 31, 2014.
Office Action from Russian Patent Application No. 2013136693, dated Nov. 28, 2014.
Office Action from Vietnamese Patent Application No. 1-2013-02120 dated Jan. 23, 2017, with English Language translation, 2 pages.
Ugur et al., "High precision bi-directional averaging", Joint CollaborativeTeam on Video Coding (JCT.VC) of ITV-T WP3 and ISO/IEC JTC1/SC29NVG11, 4th Meeting, Jan. 20-28, 2011, pp. 1-3.
Ugur et al., "On clipping in bi-directional averaging", Joint Collaborative Team on Video Coding (JCT-VC) of ITU-T WP3 and ISO/IEC JTC1/SC29/WG11, 5th Meeting, Mar. 16-23, 2011, pp. 1-4.
Ye et al., "High Precision Interpolation and Prediction"; 35 VCEG Meeting; 85. MPEG Meeting; Jul. 16, 2008-Jul. 18, 2008; Berlin; Video Coding Experts Group of ITU-T SG.16; No. VCEG-AI33; Jul. 12, 2008; XP030003598.
Yi-Jen Chiu et al.: "TE1: Fast Techniques to Improve Self Derivation of Motion Estimation"; JCT-VC Meeting; Jul. 21, 2010-Jul. 28, 2010; Geneva; Joint Collaborative Team on Video Coding of ISO/IEC JTC1/SC29/WG11 and ITU-T SG.16; Jul. 28, 2010; XP030007627.
Office Action for India Application No. 6227/CHENP/2013, dated Apr. 2, 2018, 5 pages.
Chujoh, T. et al., "Bidirectional prediction for stored B-slice," ITU-T SG16 contribution, VCEG-AI20, Berlin, Germany, Jul. 2008.

\* cited by examiner

MOTION PREDICTION IN VIDEO CODING

CROSS REFERENCE TO RELATED APPLICATION

This application is a continuation of U.S. application Ser. No. 15/490,469, filed Apr. 18, 2017, which is a continuation of U.S. application Ser. No. 15/250,124, filed Aug. 29, 2016, which is a continuation of U.S. application Ser. No. 13/344,893, filed on Jan. 6, 2012, which claims priority to U.S. Provisional Application No. 61/430,694, filed Jan. 7, 2011, the entire contents of which are incorporated herein by reference.

TECHNICAL FIELD

The present invention relates to an apparatus, a method and a computer program for producing and utilizing motion prediction information in video encoding and decoding.

BACKGROUND INFORMATION

A video codec may comprise an encoder which transforms input video into a compressed representation suitable for storage and/or transmission and a decoder that can uncompress the compressed video representation back into a viewable form, or either one of them. The encoder may discard some information in the original video sequence in order to represent the video in a more compact form, for example at a lower bit rate.

Many hybrid video codecs, operating for example according to the International Telecommunication Union's ITU-T H.263 and H.264 coding standards, encode video information in two phases. In the first phase, pixel values in a certain picture area or "block" are predicted. These pixel values can be predicted, for example, by motion compensation mechanisms, which involve finding and indicating an area in one of the previously encoded video frames (or a later coded video frame) that corresponds closely to the block being coded. Additionally, pixel values can be predicted by spatial mechanisms which involve finding and indicating a spatial region relationship, for example by using pixel values around the block to be coded in a specified manner.

Prediction approaches using image information from a previous (or a later) image can also be called as Inter prediction methods, and prediction approaches using image information within the same image can also be called as Intra prediction methods.

The second phase is one of coding the error between the predicted block of pixels and the original block of pixels. This is typically accomplished by transforming the difference in pixel values using a specified transform. This transform may be e.g. a Discrete Cosine Transform (DCT) or a variant thereof. After transforming the difference, the transformed difference may be quantized and entropy encoded.

By varying the fidelity of the quantization process, the encoder can control the balance between the accuracy of the pixel representation, (in other words, the quality of the picture) and the size of the resulting encoded video representation (in other words, the file size or transmission bit rate).

An example of the encoding process is illustrated in FIG. 1.

The decoder reconstructs the output video by applying a prediction mechanism similar to that used by the encoder in order to form a predicted representation of the pixel blocks (using the motion or spatial information created by the encoder and stored in the compressed representation of the image) and prediction error decoding (the inverse operation of the prediction error coding to recover the quantized prediction error signal in the spatial domain).

After applying pixel prediction and error decoding processes the decoder combines the prediction and the prediction error signals (the pixel values) to form the output video frame.

The decoder (and encoder) may also apply additional filtering processes in order to improve the quality of the output video before passing it for display and/or storing as a prediction reference for the forthcoming frames in the video sequence.

An example of the decoding process is illustrated in FIG. 2.

Motion Compensated Prediction (MCP) is a technique used by video compression standards to reduce the size of an encoded bitstream. In MCP, a prediction for a current frame is formed using a previously coded frame(s), where only the difference between original and prediction signals, representative of the current and predicted frames, is encoded and sent to a decoder. A prediction signal, representative of a prediction frame, is formed by first dividing a current frame into blocks, e.g., macroblocks, and searching for a best match in a reference frame for each block. In this way, the motion of a block relative to the reference frame is determined and this motion information is coded into a bitstream as motion vectors. A decoder is able to reconstruct the exact prediction frame by decoding the motion vector data encoded in the bitstream.

An example of a prediction structure is presented in FIG. 8. Boxes indicate pictures, capital letters within boxes indicate coding types, numbers within boxes are picture numbers (in decoding order), and arrows indicate prediction dependencies. In this example I-pictures are intra pictures which do not use any reference pictures and thus can be decoded irrespective of the decoding of other pictures. P-pictures are so called uni-predicted pictures i.e. they refer to one reference picture, and B-pictures are bi-predicted pictures which use two other pictures as reference pictures, or two prediction blocks within one reference picture. In other words, the reference blocks relating to the B-picture may be in the same reference picture (as illustrated with the two arrows from picture P7 to picture B8 in FIG. 8) or in two different reference pictures (as illustrated e.g. with the arrows from picture P2 and from picture B3 to picture B4 in FIG. 8).

It should also be noted here that one picture may include different types of blocks i.e. blocks of a picture may be intra-blocks, uni-predicted blocks, and/or bi-predicted blocks. Motion vectors often relate to blocks wherein for one picture a plurality of motion vectors may exist.

In some systems the uni-predicted pictures are also called as uni-directionally predicted pictures and the bi-predicted pictures are called as bi-directionally predicted pictures.

The motion vectors are not limited to having full-pixel accuracy, but could have fractional-pixel accuracy as well. That is, motion vectors can point to fractional-pixel positions/locations of the reference frame, where the fractional-pixel locations can refer to, for example, locations "in between" image pixels. In order to obtain samples at fractional-pixel locations, interpolation filters may be used in the MCP process. Conventional video coding standards describe how a decoder can obtain samples at fractional-pixel accuracy by defining an interpolation filter. In MPEG-2, for example, motion vectors can have at most, half-pixel accuracy, where the samples at half-pixel locations are obtained by a simple averaging of neighboring samples at full-pixel locations. The H.264/AVC video coding standard supports motion vectors with up to quarter-pixel accuracy. Furthermore, in the H.264/AVC video coding standard, half-pixel samples are obtained through the use of symmetric and separable 6-tap filters, while quarter-pixel samples are obtained by averaging the nearest half or full-pixel samples.

In typical video codecs, the motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). In order to represent motion vectors efficiently, motion vectors are typically coded differentially with respect to block specific predicted motion vector. In a typical video codec, the predicted motion vectors are created in a predefined way, for example by calculating the median of the encoded or decoded motion vectors of the adjacent blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize the Lagrangian cost function to find optimal coding modes, for example the desired macro block mode and associated motion vectors. This type of cost function uses a weighting factor or $\lambda$ to tie together the exact or estimated image distortion due to lossy coding methods and the exact or estimated amount of information required to represent the pixel values in an image area.

This may be represented by the equation:

$$C = D + \lambda R \qquad (1)$$

where C is the Lagrangian cost to be minimised, D is the image distortion (for example, the mean-squared error between the pixel values in original image block and in coded image block) with the mode and motion vectors currently considered, $\lambda$ is a Lagrangian coefficient and R is the number of bits needed to represent the required data to reconstruct the image block in the decoder (including the amount of data to represent the candidate motion vectors).

Some hybrid video codecs, such as H.264/AVC, utilize bi-directional motion compensated prediction to improve the coding efficiency. In bi-directional prediction, prediction signal of the block may be formed by combining, for example by averaging two motion compensated prediction blocks. This averaging operation may further include either up or down rounding, which may introduce rounding errors.

The accumulation of rounding errors in bi-directional prediction may cause degradation in coding efficiency. This rounding error accumulation may be removed or decreased by signalling whether rounding up or rounding down have been used when the two prediction signals have been combined for each frame. Alternatively the rounding error could be controlled by alternating the usage of the rounding up and rounding down for each frame. For example, rounding up may be used for every other frame and, correspondingly, rounding down may be used for every other frame.

In FIG. 9 an example of averaging two motion compensated prediction blocks using rounding is illustrated. Sample values of the first prediction reference is input 902 to a first filter 904 in which values of two or more full pixels near the point which the motion vector is referring to are used in the filtering. A rounding offset may be added 906 to the filtered value. The filtered value added with the rounding offset is right shifted 908 x-bits i.e. divided by $2^x$ to obtain a first prediction signal P1. Similar operation is performed to the second prediction reference as is illustrated with blocks 912, 914, 916 and 918 to obtain a second prediction signal P2. The first prediction signal P1 and the second prediction signal P2 are combined e.g. by summing the prediction signals P1, P2. A rounding offset may be added 920 with the combined signal after which the result is right shifted y-bits i.e. divided by $2^y$. The rounding may be upwards, if the rounding offset is positive, or downwards, if the rounding offset is negative. The direction of the rounding may always be the same, or it may alter from time to time, e.g. for each frame. The direction of the rounding may be signaled in the bitstream so that in the decoding process the same rounding direction can be used.

However, these methods increase somewhat the complexity as two separate code branches need to be written for bi-directional averaging. In addition, the motion estimation routines in the encoder may need to be doubled for both cases of rounding and truncation.

SUMMARY

The present invention introduces a method which enables reducing the effect of rounding errors in bi-directional and multi-directional prediction. According to some embodiments of the invention prediction signals are maintained in a higher precision during the prediction calculation and the precision is reduced after the two or more prediction signals have been combined with each other.

In some example embodiments prediction signals are maintained in higher accuracy until the prediction signals have been combined to obtain the bi-directional or multidirectional prediction signal. The accuracy of the bi-directional or multidirectional prediction signal can then be downshifted to an appropriate accuracy for post processing purposes. Then, no rounding direction indicator need not be included in or read from the bitstream According to a first aspect of the present invention there is provided a method comprising:

determining a block of pixels of a video representation encoded in a bitstream, values of said pixels having a first precision;

determining a type of the block;

if the determining indicates that the block is a block predicted by using two or more reference blocks, determining a first reference pixel location in a first reference block and a second reference pixel location in a second reference block;

using said first reference pixel location to obtain a first prediction, said first prediction having a second precision, which is higher than said first precision;

using said second reference pixel location to obtain a second prediction, said second prediction having the second precision, which is higher than said first precision;

combining said first prediction and said second prediction to obtain a combined prediction; and decreasing the precision of said combined prediction to said first precision.

According to a second aspect of the present invention there is provided an apparatus comprising:

a processor; and a memory unit operatively connected to the processor and including:

computer code configured to determine a block of pixels of a video representation encoded in a bitstream, values of said pixels having a first precision;

computer code configured to determine a type of the block;

computer code configured to, if the determining indicates that the block is a block predicted by using two or more reference blocks, determine a first reference pixel location in a first reference block and a second reference pixel location in a second reference block;

use said first reference pixel location to obtain a first prediction, said first prediction having a second precision, which is higher than said first precision;

use said second reference pixel location to obtain a second prediction, said second prediction having the second precision, which is higher than said first precision;

combine said first prediction and said second prediction to obtain a combined prediction; and decrease the precision of said combined prediction to said first precision.

According to a third aspect of the present invention there is provided a computer readable storage medium stored with is code thereon for use by an apparatus, which when executed by a processor, causes the apparatus to perform:

determine a block of pixels of a video representation encoded in a bitstream, values of said pixels having a first precision;

determine a type of the block;

if the determining indicates that the block is a block predicted by using two or more reference blocks, determine a first reference pixel location in a first reference block and a second reference pixel location in a second reference block;

use said first reference pixel location to obtain a first prediction, said first prediction having a second precision, which is higher than said first precision;

use said second reference pixel location to obtain a second prediction, said second prediction having the second precision, which is higher than said first precision;

combine said first prediction and said second prediction to obtain a combined prediction; and decrease the precision of said combined prediction to said first precision.

According to a fourth aspect of the present invention there is provided at least one processor and at least one memory, said at least one memory stored with code thereon, which when executed by said at least one processor, causes an apparatus to perform:

determine a block of pixels of a video representation encoded in a bitstream, values of said pixels having a first precision;

determine a type of the block;

if the determining indicates that the block is a block predicted by using two or more reference blocks, determine a first reference pixel location in a first reference block and a second reference pixel location in a second reference block;

use said first reference pixel location to obtain a first prediction, said first prediction having a second precision, which is higher than said first precision;

use said second reference pixel location to obtain a second prediction, said second prediction having the second precision, which is higher than said first precision;

combine said first prediction and said second prediction to obtain a combined prediction; and decrease the precision of said combined prediction to said first precision.

According to a fifth aspect of the present invention there is provided an apparatus comprising:

an input to determine a block of pixels of a video representation encoded in a bitstream, values of said pixels having a first precision;

a determinator to determine a type of the block; wherein if the determining indicates that the block is a block predicted by using two or more reference blocks, said determinator further to determine a first reference pixel location in a first reference block and a second reference pixel location in a second reference block;

a first predictor to use said first reference pixel location to obtain a first prediction, said first prediction having a second precision, which is higher than said first precision;

a second predictor to use said second reference pixel location to obtain a second prediction, said second prediction having the second precision, which is higher than said first precision;

a combiner to combine said first prediction and said second prediction to obtain a combined prediction; and a shifter to decrease the precision of said combined prediction to said first precision.

According to a sixth aspect of the present invention there is provided an apparatus comprising:

means for determining a block of pixels of a video representation encoded in a bitstream, values of said pixels having a first precision;

means for determining a type of the block;

means for determining a first reference pixel location in a first reference block and a second reference pixel location in a second reference block, if the determining indicates that the block is a block predicted by using two or more reference blocks;

means for using said first reference pixel location to obtain a first prediction, said first prediction having a second precision, which is higher than said first precision;

means for using said second reference pixel location to obtain a second prediction, said second prediction having the second precision, which is higher than said first precision;

means for combining said first prediction and said second prediction to obtain a combined prediction; and means for decreasing the precision of said combined prediction to said first precision.

This invention removes the need to signal the rounding offset or use different methods for rounding for different frames. This invention may keep the motion compensated prediction signal of each one of the predictions at highest precision possible after interpolation and perform the rounding to the bit-depth range of the video signal after both prediction signals are added.

DESCRIPTION OF THE DRAWINGS

For better understanding of the present invention, reference will now be made by way of example to the accompanying drawings in which:

FIG. 5 shows a flow diagram showing the operation of an embodiment of the invention with respect to the encoder as shown in FIG. 4a;

DETAILED DESCRIPTION OF SOME EXAMPLE EMBODIMENTS

Figure 1:
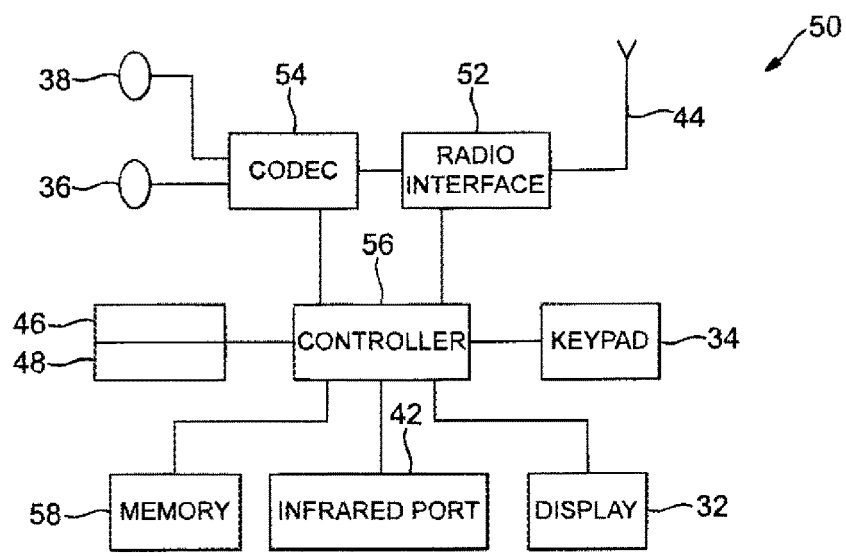
FIG. 1 shows schematically an electronic device employing some embodiments of the invention.
Figure 2:
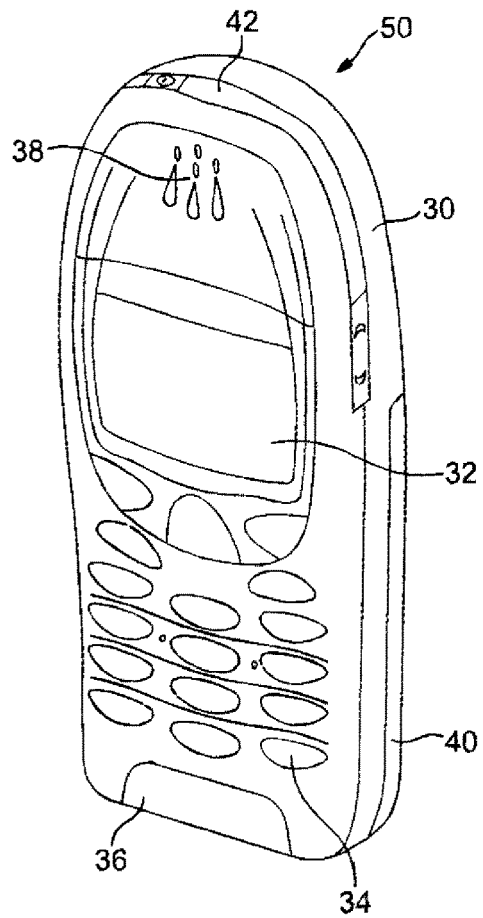
FIG. 2 shows schematically a user equipment suitable for employing some embodiments of the invention.

The following describes in further detail suitable apparatus and possible mechanisms for the provision of reducing information to be transmitted in video coding systems and more optimal codeword mappings in some embodiments. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
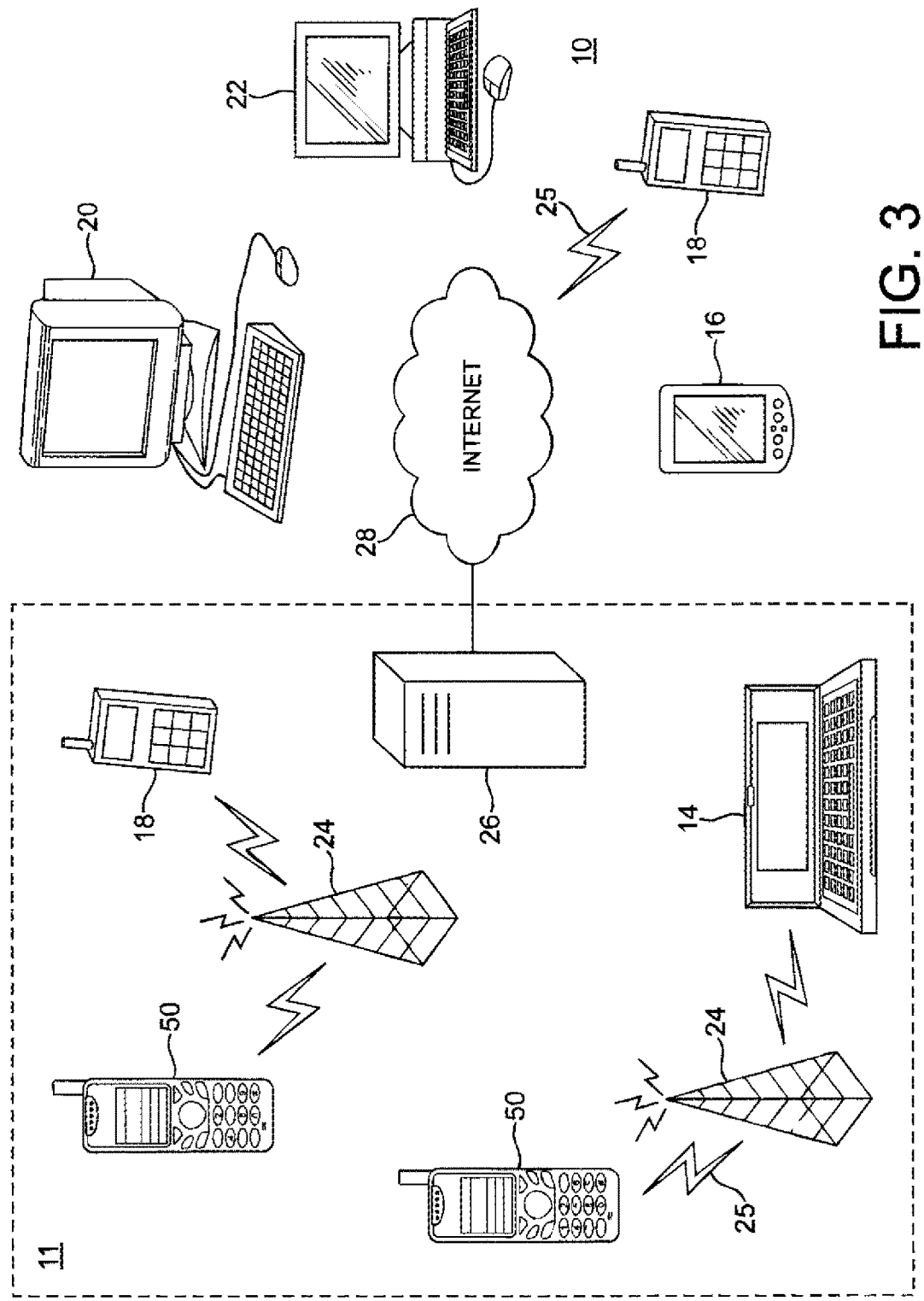
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 11:
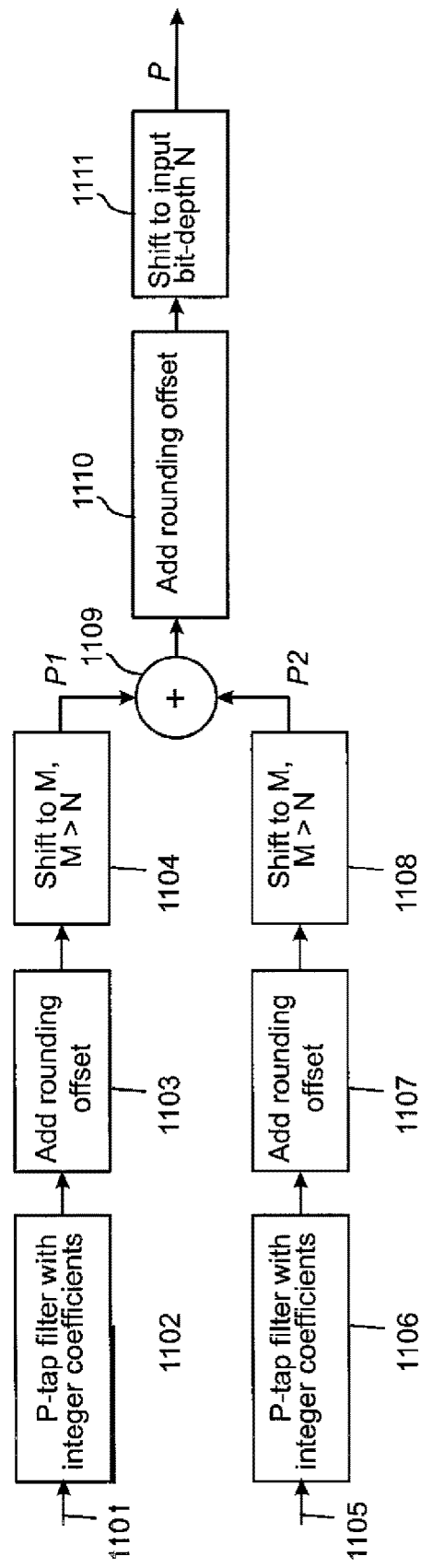
FIG. 11 depicts an example of bi-directional prediction according to an example embodiment of the present invention.

Various embodiments can extend conventional two-stage sub-pixel interpolation algorithms, such as the algorithm used in the H.264/AVC video coding standard, without the need to increase the complexity of the decoder. It should be noted here that FIG. 11 illustrates only some full pixel values which are the nearest neighbors to the example block of pixels but in the interpolation it may also be possible to use full pixel values located farther from the block under consideration. Furthermore, the present invention is not only limited to implementations using one-dimensional interpolation but the fractional pixel samples can also be obtained using more complex interpolation or filtering.

It should be noted that various embodiments can be implemented by and/or in conjunction with other video coding standards besides the H.264/AVC video coding standard.

Figure 4A:
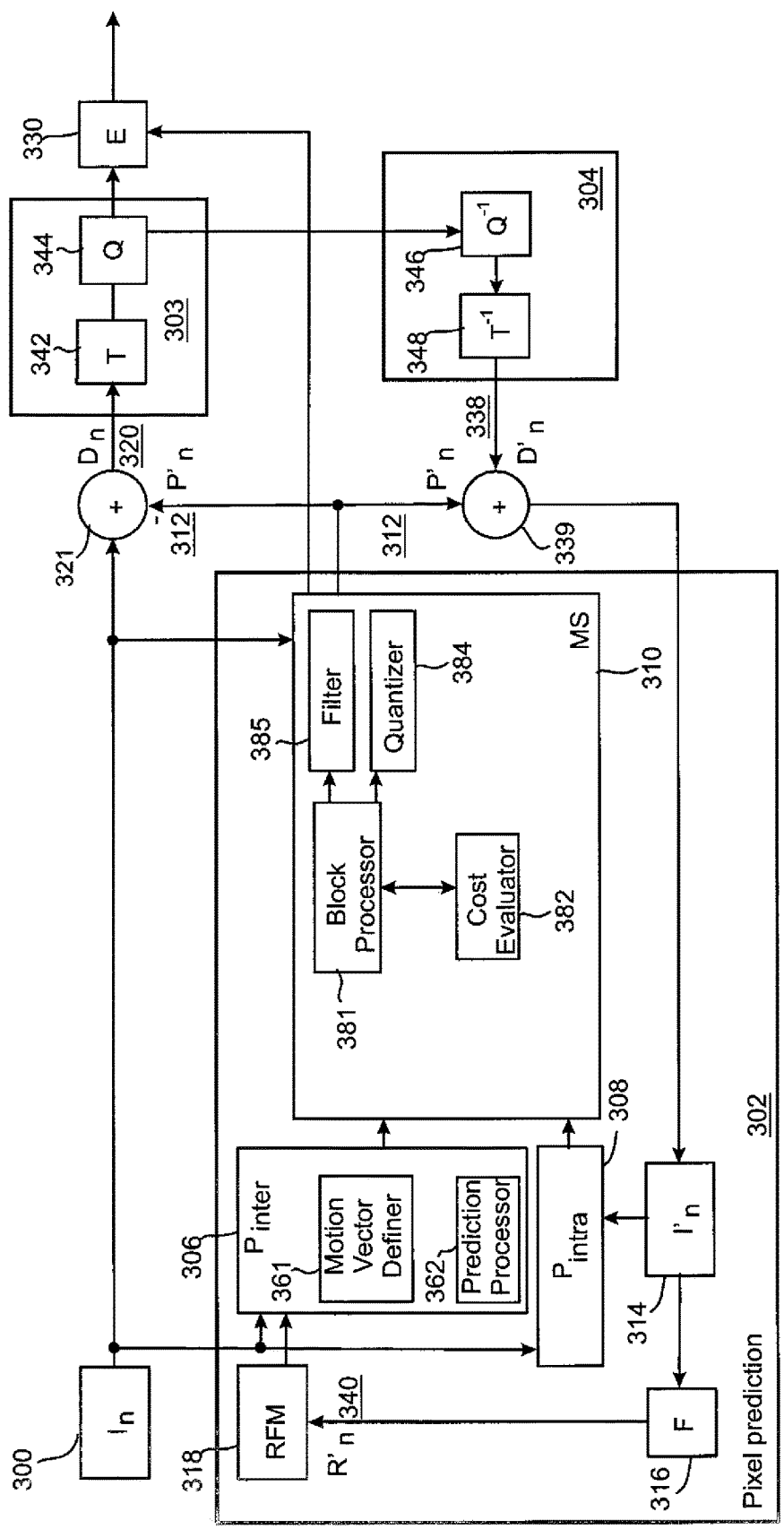
FIG. 4a shows schematically an embodiment of the invention as incorporated within an encoder.

With respect to FIG. 4a, a block diagram of a video encoder suitable for carrying out embodiments of the invention is shown. Furthermore, with respect to FIG. 5, the operation of the encoder exemplifying embodiments of the invention specifically with respect to the utilization of higher accuracy calculation of prediction signals is shown as a flow diagram.

Figure 4B:
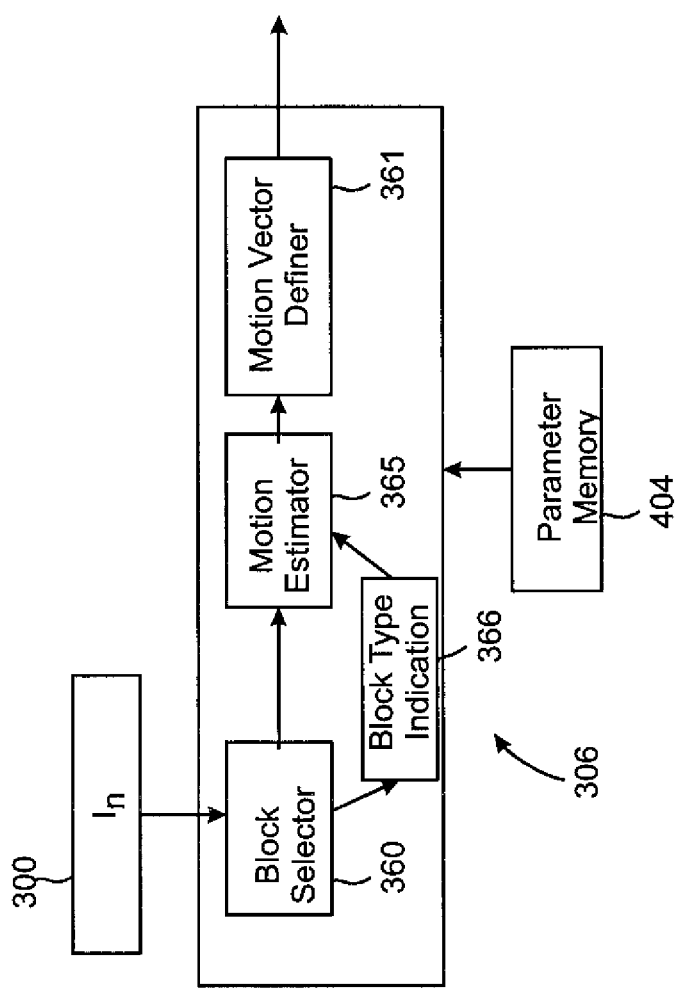
FIG. 4b shows schematically an embodiment of an inter predictor according to some embodiments of the invention.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. The mode selector 310 comprises a block processor 381 and a cost evaluator 382. FIG. 4b also depicts an embodiment of the inter-predictor 306 which comprises a block selector 360 and a motion vector definer 361, which may be implemented e.g. in a prediction processor 362. The inter-predictor 306 may also have access to a parameter memory 404. The mode selector 310 may also comprise a quantizer 384.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the image 300.

The block processor 381 determines which encoding mode to use to encode the current block. If the block processor 381 decides to use an inter-prediction mode it will pass the output of the inter-predictor 306 to the output of the mode selector 310. If the block processor 381 decides to use an intra-prediction mode it will pass the output of one of the intra-predictor modes to the output of the mode selector 310.

According to some example embodiments the pixel predictor 302 operates as follows. The inter predictor 306 and the intra prediction modes 308 perform the prediction of the current block to obtain predicted pixel values of the current block. The inter predictor 306 and the intra prediction modes 308 may provide the predicted pixel values of the current block to the block processor 381 for analyzing which prediction to select. In addition to the predicted values of the current block, the block processor 381 may, in some embodiments, receive an indication of a directional intra prediction mode from the intra prediction modes.

The block processor 381 examines whether to select the inter prediction mode or the intra prediction mode. The block processor 381 may use cost functions such as the equation (1) or some other methods to analyze which encoding method gives the most efficient result with respect to a certain criterion or criteria. The selected criteria may include coding efficiency, processing costs and/or some other criteria. The block processor 381 may examine the prediction for each directionality i.e. for each intra prediction mode and inter prediction mode and calculate the cost value for each intra prediction mode and inter prediction mode, or the block processor 381 may examine only a subset of all available prediction modes in the selection of the prediction mode.

In some embodiments the inter predictor 306 operates as follows. The block selector 360 receives a current block to be encoded (block 504 in FIG. 5) and examines whether a previously encoded image contains a block which may be used as a reference to the current block (block 505). If such a block is found from the reference frame memory 318, the motion estimator 365 may determine whether the current block could be predicted by using one or two (or more) reference blocks i.e. whether the current block could be a uni-predicted block or a bi-predicted block (block 506). If the motion estimator 365 has determined to use uni-prediction, the motion estimator 365 may indicate the reference block to the motion vector definer 361. If the motion estimator 365 has selected to use bi-prediction, the motion estimator 365 may indicate both reference blocks, or if more than two reference blocks have been selected, all the selected reference blocks to the motion vector definer 361. The motion vector definer 361 utilizes the reference block information and defines a motion vector (block 507) to indicate the correspondence between pixels of the current block and the reference block(s).

In some embodiments the inter predictor 306 calculates a cost value for both one-directional and bi-directional prediction and may then select which kind of prediction to use with the current block.

In some embodiments the motion vector may point to a full pixel sample or to a fraction pixel sample i.e. to a half pixel, to a quarter pixel or to a one-eighth pixel. The motion vector definer 361 may examine the type of the current block to determine whether the block is a bi-predicted block or another kind of a block (block 508). The type may be determined by the block type indication 366 which may be provided by the block selector 360 or another element of the encoder. If the type of the block is a bi-predicted block, two (or more) motion vectors are defined by the motion vector definer 361 (block 509). Otherwise, if the block is a uni-predicted block, one motion vector shall be defined (block 510).

It is also possible that the type of the block is determined before the motion vector is calculated.

The motion vector definer 361 provides motion vector information to the block processor 381 which uses this information to obtain the prediction signal.

When the cost has been calculated with respect to intra prediction mode and possibly with respect to the inter prediction mode(s), the block processor 381 selects one intra prediction mode or the inter prediction mode for encoding the current block.

When the inter prediction mode was selected, the predicted pixel values or predicted pixel values quantized by the optional quantizer 384 are provided as the output of the mode selector.

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations.

The operation of the pixel predictor 302 may be configured to carry out any known pixel prediction algorithm known in the art.

The pixel predictor 302 may also comprise a filter 385 to filter the predicted values before outputting them from the pixel predictor 302.

The operation of the prediction error encoder 303 and prediction error decoder 304 will be described hereafter in further detail. In the following examples the encoder generates images in terms of 16×16 pixel macroblocks which go to form the full image or picture. Thus, for the following examples the pixel predictor 302 outputs a series of predicted macroblocks of size 16×16 pixels and the first summing device 321 outputs a series of 16×16 pixel residual data macroblocks which may represent the difference between a first macro-block in the image 300 against a predicted macro-block (output of pixel predictor 302). It would be appreciated that other size macro blocks may be used.

The prediction error encoder 303 comprises a transform block 342 and a quantizer 344. The transform block 342 transforms the first prediction error signal 320 to a transform domain. The transform is, for example, the DCT transform. The quantizer 344 quantizes the transform domain signal, e.g. the DCT coefficients, to form quantized coefficients.

The entropy encoder 330 receives the output of the prediction error encoder and may perform a suitable entropy encoding/variable length encoding on the signal to provide error detection and correction capability. Any suitable entropy encoding algorithm may be employed.

The prediction error decoder 304 receives the output from the prediction error encoder 303 and performs the opposite processes of the prediction error encoder 303 to produce a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

Figure 5:
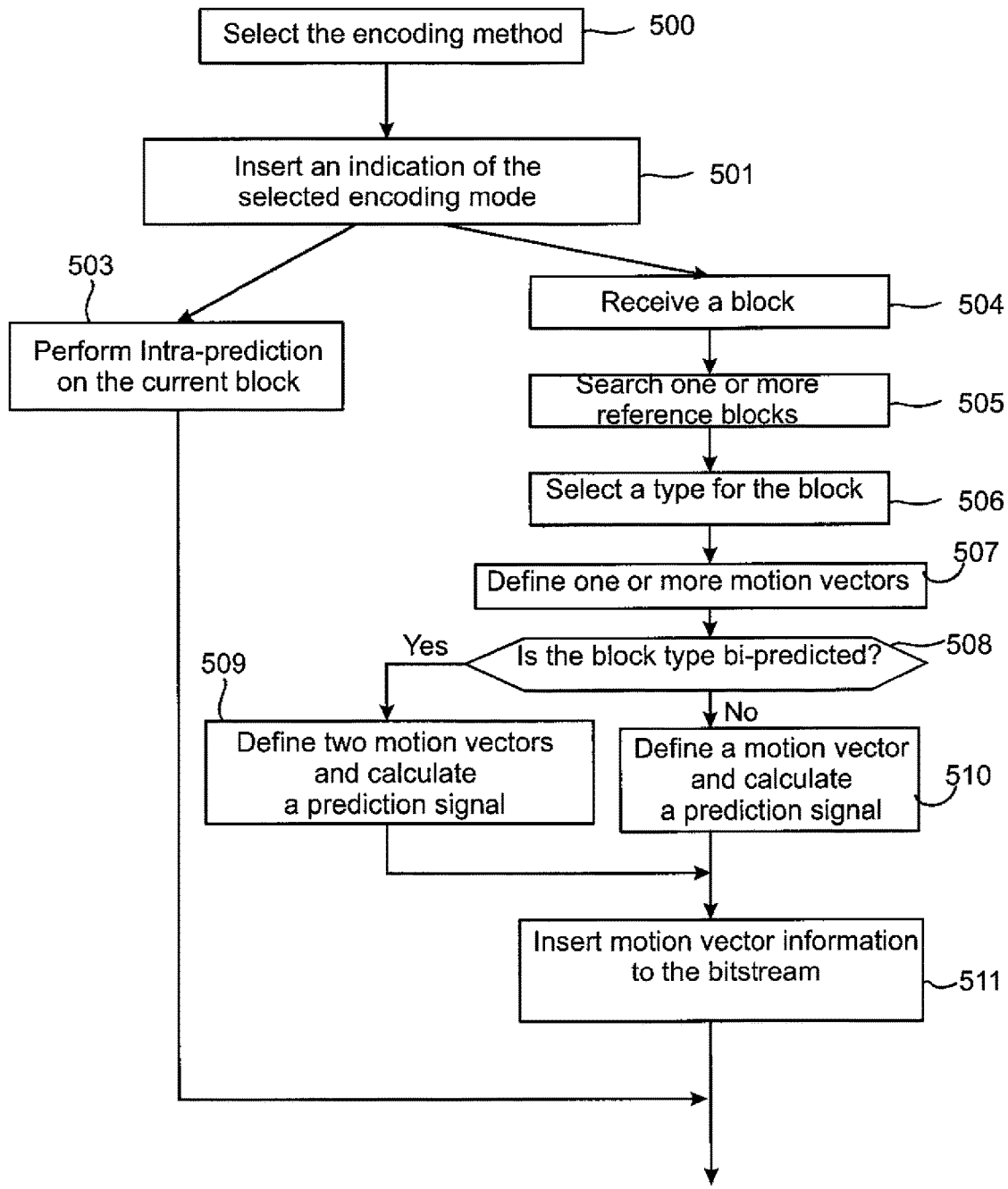

The operation and implementation of the mode selector 310 is shown in further detail with respect to FIG. 5. On the basis of the prediction signals from the output of the inter-predictor 306, the output of the intra-predictor 308 and/or the image signal 300 the block processor 381 determines which encoding mode to use to encode the current image block. This selection is depicted as the block 500 in FIG. 5. The block processor 381 may calculate a rate-distortion cost (RD) value or another cost value for the prediction signals which are input to the mode selector 310 and select such an encoding mode 503, 504 for which the determined cost is the smallest.

The mode selector 310 provides an indication of the encoding mode of the current block (501). The indication may be encoded and inserted to a bit stream or stored into a memory together with the image information.

If the intra-prediction mode is selected, the block is predicted by an intra-prediction method (503). Respectively, if the inter-prediction mode is selected, the block is predicted by an inter-prediction method (504-510).

Figure 12:
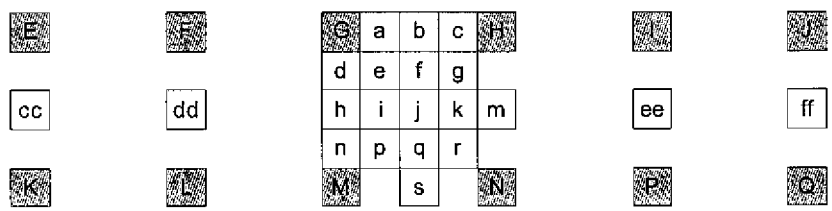
FIG. 12 illustrates an example of some possible prediction directions for a motion vector.

An example of the operation of the mode selector when the inter-prediction mode is selected and the type of the block is a bi-predicted block, is illustrated as a block diagram in FIG. 11. Motion vector information provided by the motion vector definer 361 contains indication of a first reference block and a second reference block. In multi-prediction applications the motion vector information may contain indication of more than two reference blocks. The block processor 381 uses the motion vector information to determine which block is used as a first reference block for the current block and which block is used as a second reference block for the current block. The block processor 381 then uses some pixel values of the first reference block to obtain first prediction values and some pixel values of the second reference block to obtain second prediction values. For example, if a first motion vector points to a fraction of a pixel (a subpixel) illustrated by the square b in the example of FIG. 12, the block processor 381 may use pixel values of several full pixels on the same row, for example, than said fraction of the pixel to obtain a reference pixel value. The block processor 381 may use e.g. a P-tap filter such as a six-tap filter in which P pixel values of the reference block are used to calculate the prediction value. In the example of FIG. 12 these pixel values could be pixels E, F, G, H, I and J. The taps of the filter may be e.g. integer values. An example of such a six-tap filter is [1 −5 20 20 −5 1]/32. Hence, the filter 1102 would receive 1101 the pixel values of pixels E, F, G, H, I and J and filter these values by the equation $P1=(E_1-5*F_1+20*G_1+20*H_1-5*I_1+J_1)$, in which $E_1$ is the value of the pixel E in the first reference block, $F_1$ is the value of the pixel F in the first reference block, $G_1$ is the value of the pixel G in the first reference block, $H_1$ is the value of the pixel H in the first reference block, $I_1$ is the value of the pixel I in the first reference block, and $J_1$ is the value of the pixel J in the first reference block. In the first rounding offset insertion block 1103 a first rounding offset may be added to the value P1 i.e. P1+rounding offset. Then, the sum may be shifted by the first shifting block 1104 to the right so that the precision of the sum becomes M bits. The precision M is higher than the precision of the expected prediction value. For example, pixel values and the prediction values may be represented by N bits wherein M>N. In some example implementations N is 8 bits and M is 16 bits but it is obvious that also other bit lengths can be used with the present invention.

The second prediction can be obtained similarly by the second filter 1106, which receives 1105 some pixel values of the second reference block. These pixel values are determined on the basis of the second motion vector. The second motion vector may point to the same pixel (or a fraction of the pixel) in the second reference block to which the first motion vector points in the first reference block (using the example above that pixel is the subpixel b) or to another full pixel or a subpixel in the second reference block. The second filter 1106 uses similar filter than the first filter 1102 and outputs the second filtering result P2. According to the example above the filter is a six-tap filter [1 −5 20 20 −5 1]/32, wherein $P2=(E_2-5*F_2+20*G_2+20*H_2-5*I_2+J_2)$, in which $E_2$ is the value of the pixel E in the second reference block, $F_2$ is the value of the pixel F in the second reference block, $G_2$ is the value of the pixel G in the second reference block, $H_2$ is the value of the pixel H in the second reference block, $I_2$ is the value of the pixel I in the second reference block, and $J_2$ is the value of the pixel J in the second reference block. In the second rounding offset insertion block 1107 the first rounding offset may be added to the value P2 i.e. P2+rounding offset. Then, the sum may be shifted by the second shifting block 1108 to the right so that the precision of the sum becomes M bits.

Figure 10:
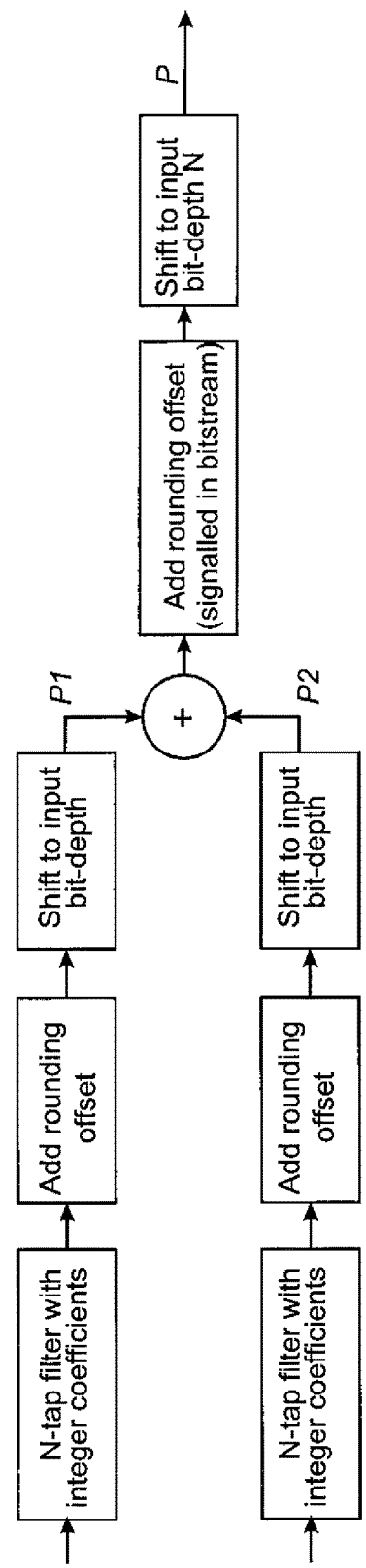
FIG. 10 depicts an example of bi-directional prediction using rounding.

In the combining block 1109 the two prediction values P1, P2 are combined e.g. by summing and the combined value is added with a second rounding value in the third rounding value insertion block 1110. The result is converted to a smaller precision e.g. by shifting bits of the result to the right y times in the third shifting block 1111. This corresponds with dividing the result by $2^y$. After the conversion the precision of the prediction signal corresponds with the precision of the input pixel values. However, the intermediate results are at a higher precision, wherein possible rounding errors have a smaller effect to the prediction signal compared to existing methods such as the method illustrated in FIG. 10.

In an alternative embodiment the rounding offset is not added separately to the results of the first 1102 and the second filter 1106 but after combining the results in the combining block 1110. In this case the value of the rounding offset is twice the value of the first rounding offset because in the embodiment of FIG. 11 the first rounding offset is actually added twice, once to P1 and once to P2.

In some embodiments also the first shifting block 1105 and the second shifting block 1109 are not needed when the precision of registers which store the filtering results is sufficient without reducing the precision of the filtering results. In that case the third shifting block may need to shift the prediction result more than y bits to the right so that the right shifted value P has the same prediction than the input pixel values, for example 8 bits.

In some other example embodiments may partly differ from the above. For example, if a motion vector of one of the prediction directions point to an integer sample, the bit-depth of prediction samples with integer accuracy may be increased by shifting the samples to the left so that the filtering can be performed with values having the same precision.

Samples of each one of the prediction directions could be rounded at an intermediate step to a bit-depth that is still larger than the input bit-depth to make sure all the intermediate values fit to registers of certain length, e.g. 16-bit registers. For example, let's consider the same example above but using filter taps: {3, −17, 78, 78, −17, 3}. Then P1 and P2 are obtained as:

$$P1=(3*E_1-17*F_1+78*G_1+78*H_1-17*I_1+3*J_1+1)>>1$$

$$P2=(3*E_2-17*F_2+78*G_2+78*H_2-17*I_2+3*J_2+1)>>1$$

The bi-directional prediction signal may then be obtained using:

$$P=(P1+P2+32)>>6.$$

When a motion vector points between two full pixels i.e. to a fraction of the pixel, the value for that the reference pixel value may be obtained in several ways. Some possibilities were disclosed above but in the following some further non-limiting examples shall be provided with reference to FIG. 12.

If a motion vector points to the block labeled j the corresponding reference pixel value could be obtained by using full pixel values on the same diagonal than j, or by a two-phase process in which e.g. pixel values of rows around the block j are used to calculate a set of intermediate results and then these intermediate results could be filtered to obtain the reference pixel value. In an example embodiment the full pixel values A and B could be used to calculate a first intermediate result to represent a fraction pixel value aa, full pixel values C and D could be used to calculate a second intermediate result to represent a fraction pixel value bb, and full pixel values E to J could be used to calculate a third intermediate result to represent a fraction pixel value b. Similarly, fourth, fifth and sixth intermediate values to represent fraction pixel values s, gg, hh could be calculated on the basis of full pixel values K to Q; R, S; and T, U. These intermediate results could then be filtered by a six-tap filter, for example.

The prediction signal P obtained by the above described operations need not be provided to a decoder but the encoder uses this information to obtain predicted blocks and prediction error. The prediction error may be provided to the decoder so that the decoder can use corresponding operations to obtain the predicted blocks by prediction and correct the prediction results on the basis of the prediction error. The encoder may also provide motion vector information to the decoder.

Figure 9:
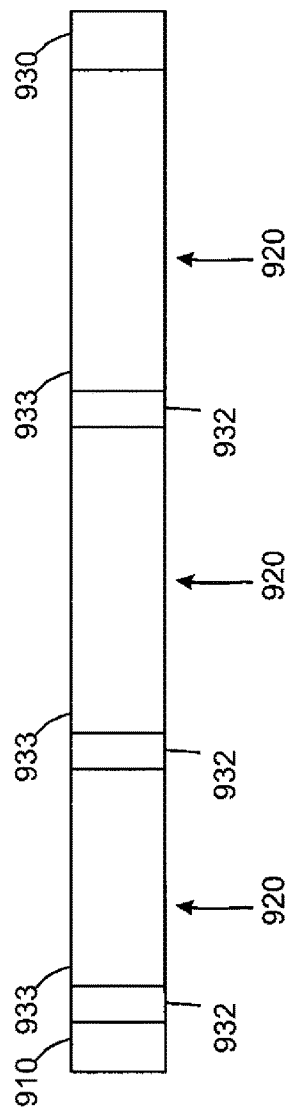
FIG. 9 depicts an example of a bit stream of an image.

In an example embodiment, as is depicted in FIG. 9, the bit stream of an image comprises an indication of the beginning of an image 910, image information of each block of the image 920, and indication of the end of the image 930. The image information of each block of the image 920 may include a block type indicator 932, and motion vector information 933. It is obvious that the bit stream may also comprise other information. Further, this is only a simplified image of the bit stream and in practical implementations the contents of the bit stream may be different from what is depicted in FIG. 9.

The bit stream may further be encoded by the entropy encoder 330.

Although the embodiments above have been described with respect to the size of the macroblock being 16×16 pixels, it would be appreciated that the methods and apparatus described may be configured to handle macroblocks of different pixel sizes.

Figure 6:
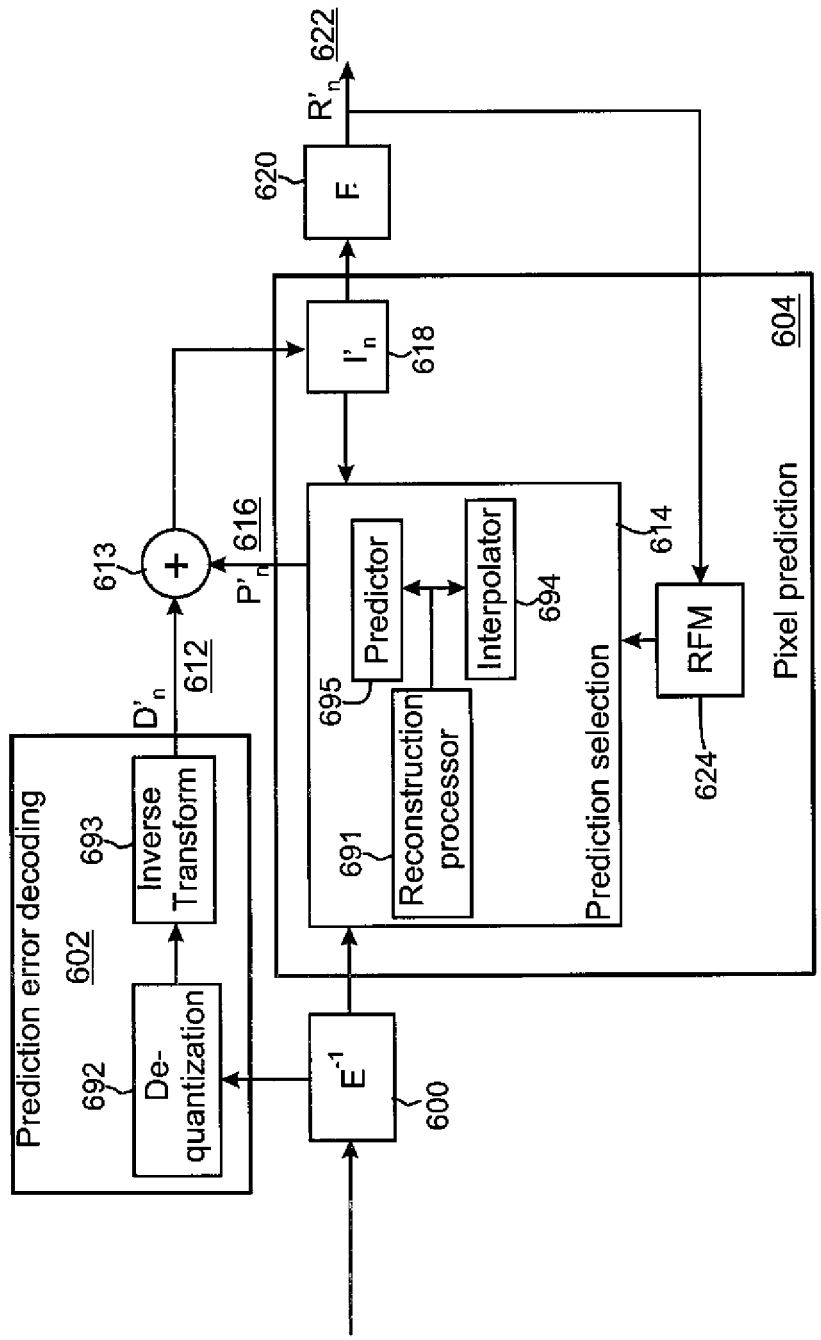
FIG. 6 shows a schematic diagram of a decoder according to some embodiments of the invention.

In the following the operation of an example embodiment of the decoder 600 is depicted in more detail with reference to FIG. 6.

Figure 7:
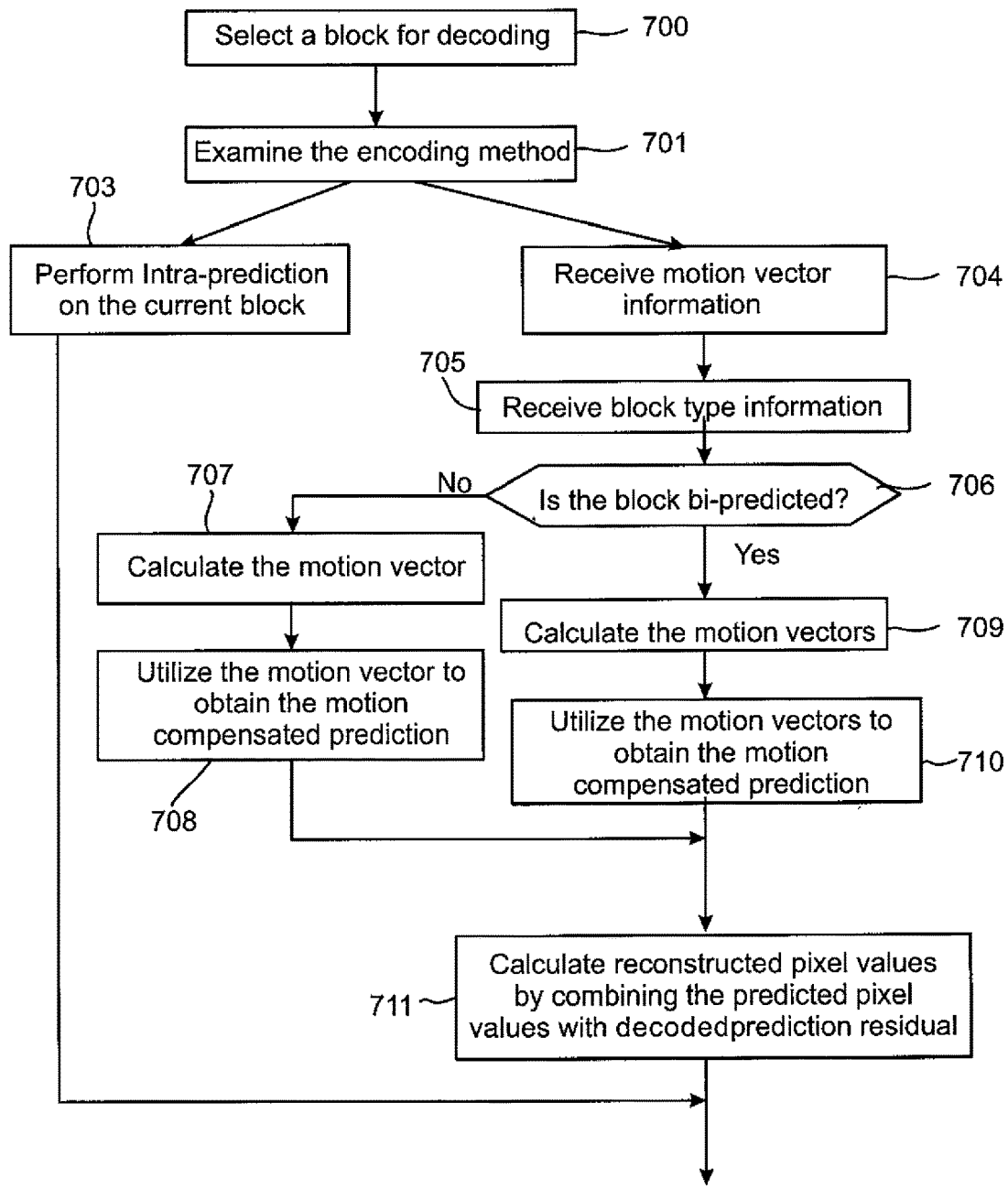
FIG. 7 shows a flow diagram of showing the operation of an embodiment of the invention with respect to the decoder shown in FIG. 6.
Figure 8:
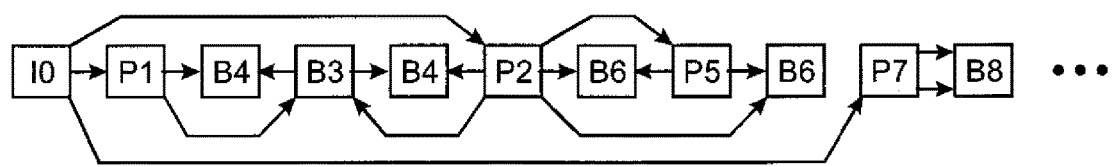
FIG. 8 illustrates an example of a prediction structure in a video sequence.

At the decoder side similar operations are performed to reconstruct the image blocks. FIG. 6 shows a block diagram of a video decoder suitable for employing embodiments of the invention and FIG. 7 shows a flow diagram of an example of a method in the video decoder. The decoder shows an entropy decoder 600 which performs an entropy decoding on the received signal. The entropy decoder thus performs the inverse operation to the entropy encoder 330 of the encoder described above. The entropy decoder 600 outputs the results of the entropy decoding to a prediction error decoder 602 and a pixel predictor 604.

The pixel predictor 604 receives the output of the entropy decoder 600. The output of the entropy decoder 600 may include an indication on the prediction mode used in encoding the current block. A predictor selector 614 within the pixel predictor 604 determines that an intra-prediction, an inter-prediction, or interpolation operation is to be carried out. The predictor selector may furthermore output a predicted representation of an image block 616 to a first combiner 613. The predicted representation of the image block 616 is used in conjunction with the reconstructed prediction error signal 612 to generate a preliminary reconstructed image 618. The preliminary reconstructed image 618 may be used in the predictor 614 or may be passed to a filter 620. The filter 620 applies a filtering which outputs a final reconstructed signal 622. The final reconstructed signal 622 may be stored in a reference frame memory 624, the reference frame memory 624 further being connected to the predictor 614 for prediction operations.

The prediction error decoder 602 receives the output of the entropy decoder 600. A dequantizer 692 of the prediction error decoder 602 may dequantize the output of the entropy decoder 600 and the inverse transform block 693 may perform an inverse transform operation to the dequantized signal output by the dequantizer 692. The output of the entropy decoder 600 may also indicate that prediction error signal is not to be applied and in this case the prediction error decoder produces an all zero output signal.

The decoder selects the 16×16 pixel residual macroblock to reconstruct. The selection of the 16×16 pixel residual macroblock to be reconstructed is shown in step 700.

The decoder receives information on the encoding mode used when the current block has been encoded. The indication is decoded, when necessary, and provided to the reconstruction processor 691 of the prediction selector 614. The reconstruction processor 691 examines the indication (block 701 in FIG. 7) and selects one of the intra-prediction modes (block 703), if the indication indicates that the block has been encoded using intra-prediction, or an inter-prediction mode (blocks 704-711), if the indication indicates that the block has been encoded using inter-prediction.

If the current block has been encoded using inter-prediction, the pixel predictor 604 may operate as follows. The pixel predictor 604 receives motion vector information (block 704). The pixel predictor 604 also receives (block 705) block type information and examines whether the block is a bi-predicted block or not (block 706). If the block type is a bi-predicted block, the pixel predictor 604 examines the motion vector information to determine which reference frames and reference block in the reference frames have been used in the construction of the motion vector information. The reconstruction processor 691 calculates the motion vectors (709) and uses the value of the (fraction of the) pixel of the reference blocks to which the motion vectors point to obtain a motion compensated prediction (710) and combines the prediction error with the value to obtain a reconstructed value of a pixel of the current block (block 711).

If the block type is a uni-predicted block, the pixel predictor 604 examines the motion vector information to determine which reference frame and reference block in the reference frame has been used in the construction of the motion vector information. The reconstruction processor 691 calculates the motion vector (707) and uses the value of the (fraction of the) pixel of the reference block to which the motion vector points to obtain a motion compensated prediction (708) and combines the prediction error with the value to obtain a reconstructed value of a pixel of the current block (block 711).

When the motion vector does not point to a full pixel sample in the reference block, the reconstruction processor 691 calculates using e.g. a one-directional interpolation or P-tap filtering (e.g. six-tap filtering) to obtain the values of the fractional pixels. Basically, the operations may be performed in the same way than in the encoder i.e. maintaining the higher accuracy values during the filtering until in the final rounding operation the accuracy may be decreased to the accuracy of the input pixels. Therefore, the effect of possible rounding errors may not be so large to the predicted values than in known methods.

The above described procedures may be repeated to each pixel of the current block to obtain all reconstructed pixel values for the current block.

In some embodiments the reconstruction processor 691 use the interpolator 694 to perform the calculation of the fractional pixel values.

In some embodiments the reconstruction processor 691 provides the fractional pixel values to the predictor 695 which combines the fractional pixel values with prediction error to obtain the reconstructed values of the pixels of the current block.

In some embodiments the interpolation may also be performed by using full pixel values, half pixel values, and/or quarter pixel values which may have been stored into a reference frame memory. For example, the encoder or the decoder may comprise a reference frame memory in which the full pixel samples, half pixel values and quarter pixel values can be stored.

Furthermore, in some embodiments the type of the block may also be a multi-predicted block wherein the prediction of a block may be based on more than two reference blocks.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

A method according to a first embodiment comprises:
determining a block of pixels of a video representation encoded in a bitstream, values of said pixels having a first precision;
determining a type of the block;
if the determining indicates that the block is a block predicted by using two or more reference blocks,
determining a first reference pixel location in a first reference block and a second reference pixel location in a second reference block;
using said first reference pixel location to obtain a first prediction, said first prediction having a second precision, which is higher than said first precision;
using said second reference pixel location to obtain a second prediction, said second prediction having the second precision, which is higher than said first precision;
combining said first prediction and said second prediction to obtain a combined prediction; and
decreasing the precision of said combined prediction to said first precision.

In some methods according to the first embodiment a first rounding offset is inserted to said first prediction and said second prediction.

In some methods according to the first embodiment the precision of said first prediction and said second prediction is reduced to an intermediate prediction after adding said first rounding offset, said intermediate prediction being higher than said first precision.

In some methods according to the first embodiment a second rounding offset is inserted to the combined prediction before said decreasing.

In some methods according to the first embodiment said type of the block is a bi-directional block.

In some methods according to the first embodiment said type of the block is a multidirectional block.

In some methods according to the first embodiment the first rounding offset is $2^y$, and said decreasing comprises right shifting the combined prediction y+1 bits.

In some methods according to the first embodiment the first precision is 8 bits.

In some methods according to the first embodiment the value of y is 5.

In some methods according to the first embodiment said first prediction and said second prediction are obtained by filtering pixel values of said reference blocks.

In some methods according to the first embodiment the filtering is performed by a P-tap filter.

An apparatus according to a second embodiment comprises:
a processor; and
a memory unit operatively connected to the processor and including:
computer code configured to determine a block of pixels of a video representation encoded in a bitstream, values of said pixels having a first precision;

computer code configured to determine a type of the block;

computer code configured to, if the determining indicates that the block is a block predicted by using two or more reference blocks, determine a first reference pixel location in a first reference block and a second reference pixel location in a second reference block;

use said first reference pixel location to obtain a first prediction, said first prediction having a second precision, which is higher than said first precision;

use said second reference pixel location to obtain a second prediction, said second prediction having the second precision, which is higher than said first precision;

combine said first prediction and said second prediction to obtain a combined prediction; and decrease the precision of said combined prediction to said first precision.

In some apparatuses according to the second embodiment the computer code is further configured to insert a first rounding offset to said first prediction and said second prediction.

In some apparatuses according to the second embodiment the computer code is further configured to reduce the precision of said first prediction and said second prediction to an intermediate prediction after adding said first rounding offset, said intermediate prediction being higher than said first precision.

In some apparatuses according to the second embodiment the computer code is further configured to insert a second rounding offset to the combined prediction before said decreasing.

In some apparatuses according to the second embodiment said type of the block is a bi-directional block.

In some apparatuses according to the second embodiment said type of the block is a multidirectional block.

In some apparatuses according to the second embodiment the first rounding offset is $2^y$, and said decreasing comprises right shifting the combined prediction y+1 bits.

In some apparatuses according to the second embodiment the first precision is 8 bits.

In some apparatuses according to the second embodiment the value of y is 5.

In some apparatuses according to the second embodiment the computer code is further configured to obtain said first prediction and said second prediction by filtering pixel values of said reference blocks.

In some apparatuses according to the second embodiment said filtering comprises a P-tap filter.

According to a third embodiment there is provided a computer readable storage medium stored with code thereon for use by an apparatus, which when executed by a processor, causes the apparatus to:

determine a block of pixels of a video representation encoded in a bitstream, values of said pixels having a first precision;

determine a type of the block;

if the determining indicates that the block is a block predicted by using two or more reference blocks, determine a first reference pixel location in a first reference block and a second reference pixel location in a second reference block;

use said first reference pixel location to obtain a first prediction, said first prediction having a second precision, which is higher than said first precision;

use said second reference pixel location to obtain a second prediction, said second prediction having the second precision, which is higher than said first precision;

combine said first prediction and said second prediction to obtain a combined prediction; and decrease the precision of said combined prediction to said first precision.

According to a fourth embodiment there is provided at least one processor and at least one memory, said at least one memory stored with code thereon, which when executed by said at least one processor, causes an apparatus to perform:

determine a block of pixels of a video representation encoded in a bitstream, values of said pixels having a first precision;

determine a type of the block;

if the determining indicates that the block is a block predicted by using two or more reference blocks, determine a first reference pixel location in a first reference block and a second reference pixel location in a second reference block;

use said first reference pixel location to obtain a first prediction, said first prediction having a second precision, which is higher than said first precision;

use said second reference pixel location to obtain a second prediction, said second prediction having the second precision, which is higher than said first precision;

combine said first prediction and said second prediction to obtain a combined prediction; and decrease the precision of said combined prediction to said first precision.

According to some example embodiments the apparatus is an encoder.

According to some example embodiments the apparatus is a decoder.

An apparatus according to a fifth embodiment comprises:

an input to determine a block of pixels of a video representation encoded in a bitstream, values of said pixels having a first precision;

a determinator to determine a type of the block; wherein if the determining indicates that the block is a block predicted by using two or more reference blocks, said determinator further to determine a first reference pixel location in a first reference block and a second reference pixel location in a second reference block;

a first predictor to use said first reference pixel location to obtain a first prediction, said first prediction having a second precision, which is higher than said first precision;

a second predictor to use said second reference pixel location to obtain a second prediction, said second prediction having the second precision, which is higher than said first precision;

a combiner to combine said first prediction and said second prediction to obtain a combined prediction; and a shifter to decrease the precision of said combined prediction to said first precision.

An apparatus according to a sixth embodiment comprises:

means for determining a block of pixels of a video representation encoded in a bitstream, values of said pixels having a first precision;

means for determining a type of the block;

means for determining a first reference pixel location in a first reference block and a second reference pixel location in a second reference block, if the determining indicates that the block is a block predicted by using two or more reference blocks;

means for using said first reference pixel location to obtain a first prediction, said first prediction having a second precision, which is higher than said first precision;

means for using said second reference pixel location to obtain a second prediction, said second prediction having the second precision, which is higher than said first precision;

means for combining said first prediction and said second prediction to obtain a combined prediction; and means for decreasing the precision of said combined prediction to said first precision.

What is claimed is:

1. A method for decoding or encoding a block of pixels, the method comprising:
   for the block of pixels, determining a first reference pixel location in a first reference block and a second reference pixel location in a second reference block, wherein the pixels have values with a first precision, and wherein the first precision indicates a number of bits needed to represent the values of the pixels;
   using said first reference pixel location to obtain a first prediction, said first prediction having a second precision, which is higher than said first precision;
   using said second reference pixel location to obtain a second prediction, said second prediction having the second precision, wherein the second precision indicates the number of bits needed to represent values of said first prediction and values of said second prediction;
   obtaining a combined prediction based at least partly upon said first prediction and said second prediction; and
   decreasing a precision of said combined prediction by shifting bits of the combined prediction to the right.

2. The method according to claim 1, wherein said second reference pixel location is an integer sample, and wherein said second prediction is obtained by shifting a value of said second reference pixel location to the left.

3. The method according to claim 1 further comprising:
   inserting a first rounding offset to said first prediction and said second prediction.

4. The method according to claim 3 further comprising:
   inserting a second rounding offset to the combined prediction before said decreasing.

5. The method according to claim 3, wherein the first rounding offset is $2^y$, and said decreasing comprises right shifting the combined prediction y+1 bit.

6. The method according to claim 1 further comprising:
   reducing the precision of said first prediction and said second prediction to an intermediate prediction after adding a first rounding offset, said intermediate prediction being higher than said first precision.

7. The method according to claim 1, wherein said type of the block is a bi-directional block or a multidirectional block.

8. An apparatus for decoding or encoding a block of pixels, the apparatus comprising:
   at least one processor and at least one memory including computer program code, the at least one memory and computer program code configured to, with the processor, cause the apparatus to:
   for the block of pixels, determine a first reference pixel location in a first reference block and a second reference pixel location in a second reference block, wherein the pixels have values with a first precision, and wherein the first precision indicates a number of bits needed to represent the values of the pixels;
   use said first reference pixel location to obtain a first prediction, said first prediction having a second precision, which is higher than said first precision;
   use said second reference pixel location to obtain a second prediction, said second prediction having the second precision, wherein the second precision indicates the number of bits needed to represent values of said first prediction and values of said second prediction;
   obtain a combined prediction based at least partly upon said first prediction and said second prediction; and
   decrease a precision of said combined prediction by shifting bits of the combined prediction to the right.

9. The apparatus according to claim 8, wherein said second reference pixel location is an integer sample, and wherein said second prediction is obtained by shifting a value of said second reference pixel location to the left.

10. The apparatus according to claim 8, wherein the at least one memory and computer code are further configured to:
    insert a first rounding offset to said first prediction and said second prediction.

11. The apparatus according to claim 10, wherein the at least one memory and computer code are further configured to:
    insert a second rounding offset to the combined prediction before said decreasing.

12. The apparatus according to claim 10, wherein the first rounding offset is $2^y$, and said decreasing comprises right shifting the combined prediction y+1 bits.

13. The apparatus according to claim 8, wherein the at least one memory and computer code are further configured to:
    reduce the precision of said first prediction and said second prediction to an intermediate prediction after adding said first rounding offset, said intermediate prediction being higher than said first precision.

14. The apparatus according to claim 8, wherein said type of the block is a bi-directional block or a multidirectional block.

15. A computer program product for decoding or encoding a block of pixels, the computer program product comprising at least one non-transitory computer readable storage medium having computer executable program code portions stored therein, the computer executable program code portions comprising program code instructions configured to:
    for the block of pixels, determine a first reference pixel location in a first reference block and a second reference pixel location in a second reference block, wherein the pixels have values with a first precision, and wherein the first precision indicates a number of bits needed to represent the values of the pixels;
    use said first reference pixel location to obtain a first prediction, said first prediction having a second precision, which is higher than said first precision;
    use said second reference pixel location to obtain a second prediction, said second prediction having the second precision, wherein the second precision indicates the number of bits needed to represent values of said first prediction and values of said second prediction;
    obtain a combined prediction based at least partly upon said first prediction and said second prediction; and
    decrease a precision of said combined prediction by shifting bits of the combined prediction to the right.

16. The computer program product according to claim 15, wherein said second reference pixel location is an integer sample, and wherein said second prediction is obtained by shifting a value of said second reference pixel location to the left.

17. The computer program product according to claim 15 further comprising:
inserting a first rounding offset to said first prediction and said second prediction; and
inserting a second rounding offset to the combined prediction before said decreasing.

18. The computer program product according to claim 15, further comprising inserting a first rounding offset to said first prediction and said second prediction, wherein the first rounding offset is $2^y$, and said decreasing comprises right shifting the combined prediction y+1 bit.

19. An apparatus for decoding or encoding a block of pixels, the apparatus comprising:
a determinator to determine, for the block of pixels, a first reference pixel location in a first reference block and a second reference pixel location in a second reference block, wherein the pixels have values with a first precision, and wherein the first precision indicates a number of bits needed to represent the values of the pixels;
a first predictor to use said first reference pixel location to obtain a first prediction, said first prediction having a second precision, which is higher than said first precision;
a second predictor to use said second reference pixel location to obtain a second prediction, said second prediction having the second precision, wherein the second precision indicates the number of bits needed to represent values of said first prediction and values of said second prediction;
a combiner to obtain a combined prediction based at least partly upon said first prediction and said second prediction; and
a shifter to decrease the precision of said combined prediction by shifting bits of the combined prediction to the right.

20. The apparatus according to claim 19, wherein said second reference pixel location is an integer sample, and wherein said second prediction is obtained by shifting a value of said second reference pixel location to the left.

21. The apparatus according to claim 19 further configured to:
insert a first rounding offset to said first prediction and said second prediction; and
insert a second rounding offset to the combined prediction before said decreasing.

22. The apparatus according to claim 19, further configured to insert a first rounding offset to said first prediction and said second prediction, wherein the first rounding offset is $2^y$, and said decreasing comprises right shifting the combined prediction y+1 bit.

23. An apparatus for decoding or encoding a block of pixels, the apparatus comprising:
means for determining, for the block of pixels, a first reference pixel location in a first reference block and a second reference pixel location in a second reference block, wherein the pixels have values with a first precision, and wherein the first precision indicates a number of bits needed to represent the values of the pixels;
means for using said first reference pixel location to obtain a first prediction, said first prediction having a second precision, which is higher than said first precision;
means for using said second reference pixel location to obtain a second prediction, said second prediction having the second precision, wherein the second precision indicates the number of bits needed to represent values of said first prediction and values of said second prediction;
means for obtaining a combined prediction based at least partly upon said first prediction and said second prediction; and
means for decreasing the precision of said combined prediction by shifting bits of the combined prediction to the right.

24. The apparatus according to claim 23, wherein said second reference pixel location is an integer sample, and wherein said second prediction is obtained by shifting a value of said second reference pixel location to the left.

25. The apparatus according to claim 23 further comprising:
means for inserting a first rounding offset to said first prediction and said second prediction; and
means for inserting a second rounding offset to the combined prediction before said decreasing.

26. The apparatus according to claim 23, further comprising means for inserting a first rounding offset to said first prediction and said second prediction, wherein the first rounding offset is $2^y$, and said decreasing comprises right shifting the combined prediction y+1 bit.

\* \* \* \* \*